United States Patent [19]

Lycan

[11] 4,373,267
[45] Feb. 15, 1983

[54] GAUGE CALIBRATION BLOCK

[76] Inventor: Goodwin A. Lycan, P.O. Box 23, Stevensville, Mich. 49127

[21] Appl. No.: 282,526

[22] Filed: Jul. 13, 1981

[51] Int. Cl.³ .............................................. G01B 3/30
[52] U.S. Cl. ................................ 33/168 R; 33/174 H; 73/1 J
[58] Field of Search ............. 33/168 R, 174 H, 143 R, 33/143 M, 169 B; 73/1 J

[56] References Cited

U.S. PATENT DOCUMENTS

| | | | |
|---|---|---|---|
| 2,293,411 | 8/1942 | Spillman | 33/143 M |
| 2,758,514 | 8/1956 | Cadwallader | 33/168 R |
| 3,869,801 | 3/1975 | Lycan | 33/143 M |
| 4,165,566 | 8/1979 | Lycan | 33/169 B |

FOREIGN PATENT DOCUMENTS 1156525 5/1958 France ............................. 33/168 R

OTHER PUBLICATIONS

"Silicon Dioxide Step Gauge"; vol. 5, No. 10, IBM Technical Disclosure Bulletin–Mar. 10, 1963.

*Primary Examiner*—Willis Little
*Attorney, Agent, or Firm*—Oltsch, Knoblock & Hall

[57] ABSTRACT

An improvement to an instrument calibration block, which includes an arm member pivotally connected to the calibration block. The arm member when in its operative position positions the instrument to be tested so as to provide for a highly accurate calibration.

3 Claims, 3 Drawing Figures

GAUGE CALIBRATION BLOCK

SUMMARY OF THE INVENTION

This invention relates to an improvement of a calibration block used to determine the accuracy of gauges.

The calibration block has an opening in its face, through which the bar members of an offset gauge are inserted. Each bar member of the gauge terminates in a contact which is set on a calibrating step of the block. In order to obtain accurate readings, the bar members must be perpendicular to the face of the gauge during calibration.

In a gauge as shown in U.S. Pat. No. 3,869,801, incorporated herein by reference, a shoulder part is attached to the bar members of the gauge and serves to position the gauge in proper calibrating position throughout.

However, other gauges have no shoulder part, so other methods of positioning the bar members must be utilized to insure that the bar members remain perpendicular during calibration.

This invention provides for an arm member to be connected to the block and which allows for proper positioning of a gauge without a shoulder part. The arm member will be shiftable between an operative position to allow a gauge with no shoulder part to be positioned properly within the block opening, and an inoperative position, in which the arm member will not interfere with the positioning of a gauge as described in U.S. Pat. No. 3,819,801.

Accordingly, it is an object of this invention to provide for a calibration block which selectively positions the bar members of a gauge within the block.

Another object of this invention is to provide a method of positioning a gauge in a calibration block to effect more accurate readings during calibration.

Another object of this invention is to provide an economical and efficient method for positioning gauges in a calibration block.

Other objects of this invention will become apparent upon a reading of the invention's description.

BRIEF DESCRIPTION OF THE DRAWINGS

A preferred embodiment of this invention has been chosen for purposes of illustration and description wherein.

DESCRIPTION OF THE PREFERRED EMBODIMENT

Figure 1:
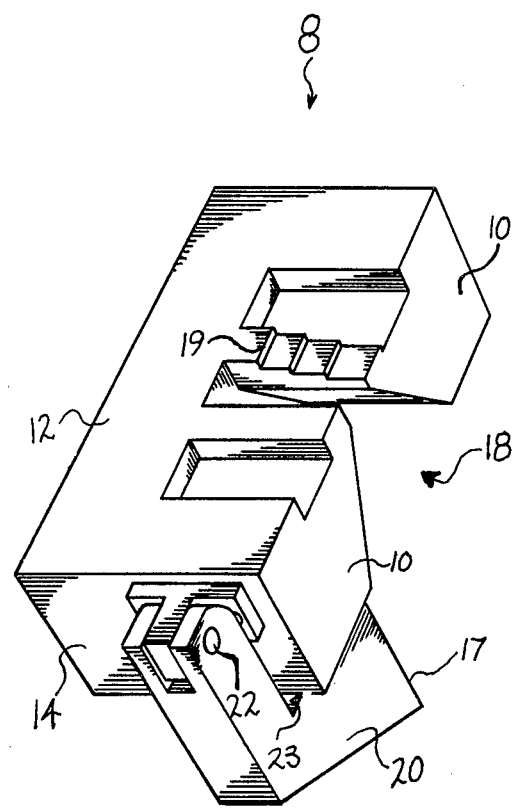
FIG. 1 is a perspective view of a calibration block showing the arm member of this invention in its operative position.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Calibration block 8 includes a front face 10, top face 12, side faces 14, bottom face 16, and a back face (not shown). Calibration steps 19 are located on top face 12, steps 19 being of a precise depth to insure accurate readings. An opening 18 is formed within calibration block 8, next to steps 19. An arm member 20, rotating about a pivot pin 22, is connected to block 8, which allows arm member 20 to move into operative or inoperative positions.

Figure 3:
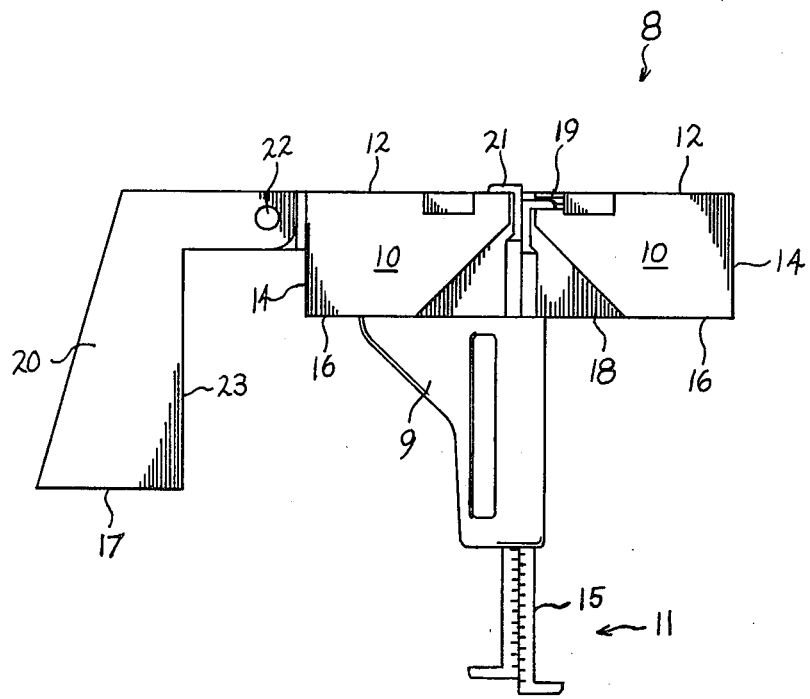
FIG. 3 is an elevational view of the block with a modified gauge in position and the arm member in its inoperative position.

FIG. 3 shows block 8, with a gauge 11, consisting of bar members 15, contacts 21 and a shoulder part 9 in calibrating position. Shoulder part 9 contacts the bottom face of block 8 to perpendicularly position bar members 15 during calibration. Arm member 20 is in its inoperative position, so as not to interfere with the positioning of gauge 11.

Figure 2:
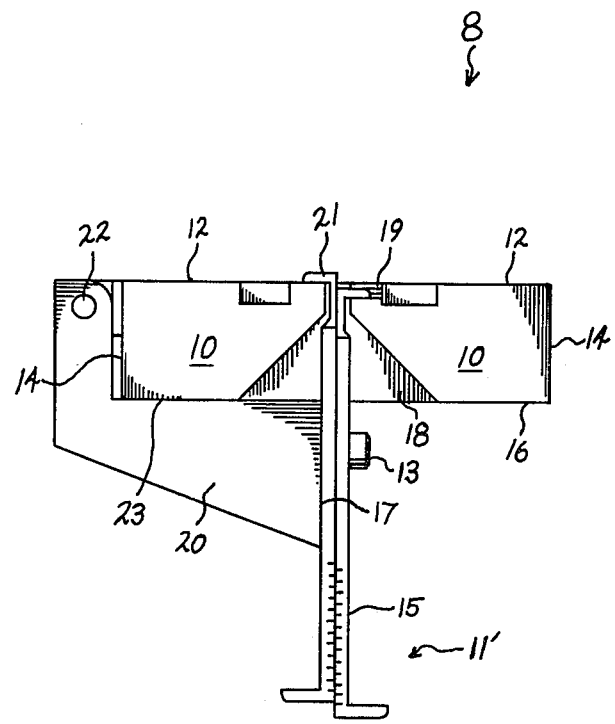
FIG. 2 is an elevational view of the block with a gauge in calibrating position and the arm member in its operative position.

FIG. 2 shows a modified gauge 11', with bar members 15 and contacts 21 in calibrating position. In this gauge construction a tightening screw 13 holds the bar members 15 together during calibration. Arm member 20 is shown in its operative position with face 23 abutting the bottom face of block 8. Side face 17 of arm member 20 contacts a bar member 15 of gauge 11' and serves to hold bar members 15 in a position perpendicular to top face 12, thus insuring accurate calibration of gauge 11'.

It is to be understood that the invention is not to be limited to the details given above, but may be modified within the scope of the appended claims.

What I claim is:

1. In a block for calibrating an offset gauge having longitudinally displaceable bar members having oppositely extending contacts, said block having a top face, and a bottom face, graduated steps in said top face and a longitudinal opening extending through said block from said top face to said bottom face at said steps, said opening constituting means through which said gauge is fitted with said contacts thereof contacting said steps to displace said bar members, the improvement comprising: an arm member pivotally connected to said block and including a side face, said arm member having an inoperative position wherein said arm member extends outwardly from said block, and an operative position wherein said arm member side face forms a selected angle with said block bottom face and therein when in said operative position constitutes means for contacting said gauge to position said gauge within said block opening.

2. The calibration block of claim 1 wherein said arm member contacts said bottom face when said arm member is in said operative position.

3. The calibration block of claim 1 wherein said selected angle of said arm member is a right angle relative to said block bottom face.

* * * * *